(12) United States Patent
Eckelt et al.

(10) Patent No.: US 6,839,167 B2
(45) Date of Patent: Jan. 4, 2005

(54) PROJECTOR SCREEN MADE FROM A COMPOSITE GLASS

(75) Inventors: Christian Eckelt, Steyr (AT);
Wolfgang Dirisamer, Linz (AT)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/250,943

(22) PCT Filed: Jan. 17, 2002

(86) PCT No.: PCT/AT02/00019
§ 371 (c)(1),
(2), (4) Date: Nov. 20, 2003

(87) PCT Pub. No.: WO02/057850
PCT Pub. Date: Jul. 25, 2002

(65) Prior Publication Data
US 2004/0075896 A1 Apr. 22, 2004

(30) Foreign Application Priority Data
Jan. 18, 2001 (AT) ............................................ 83/2001

(51) Int. Cl.[7] ............................................. G03B 21/56
(52) U.S. Cl. ...................................... 359/443; 359/460
(58) Field of Search ................................. 359/443, 460

(56) References Cited

U.S. PATENT DOCUMENTS

| | | | |
|---|---|---|---|
| 2,180,113 A | 11/1939 | Land | 88/24 |
| 3,779,630 A | 12/1973 | Clausen et al. | 350/117 |
| 3,846,011 A | 11/1974 | Stein | 350/117 |
| 4,219,253 A | 8/1980 | Campion et al. | 350/129 |
| 6,411,436 B1 * | 6/2002 | Kikuchi | 359/460 |
| 6,724,529 B2 * | 4/2004 | Sinkoff | 359/443 |

FOREIGN PATENT DOCUMENTS

GB  20012471 U1  9/2000

* cited by examiner

Primary Examiner—Christopher E Mahoney
(74) Attorney, Agent, or Firm—Oblon, Spivak, McClelland, Maier & Neustadt, P.C.

(57) ABSTRACT

A projection screen (1) made of a laminated glass which has at least two glass plates (3, 4) bonded to each other by means of a layer of plastic (2) is described. In order to create advantageous construction conditions, it is proposed that the glass plate (3) facing the projection bears on its outer side (6) a translucent ceramic coating extending at least over the projection area and that the glass plate (4) facing away from the projection preferably has a surface roughness preventing reflections.

9 Claims, 1 Drawing Sheet

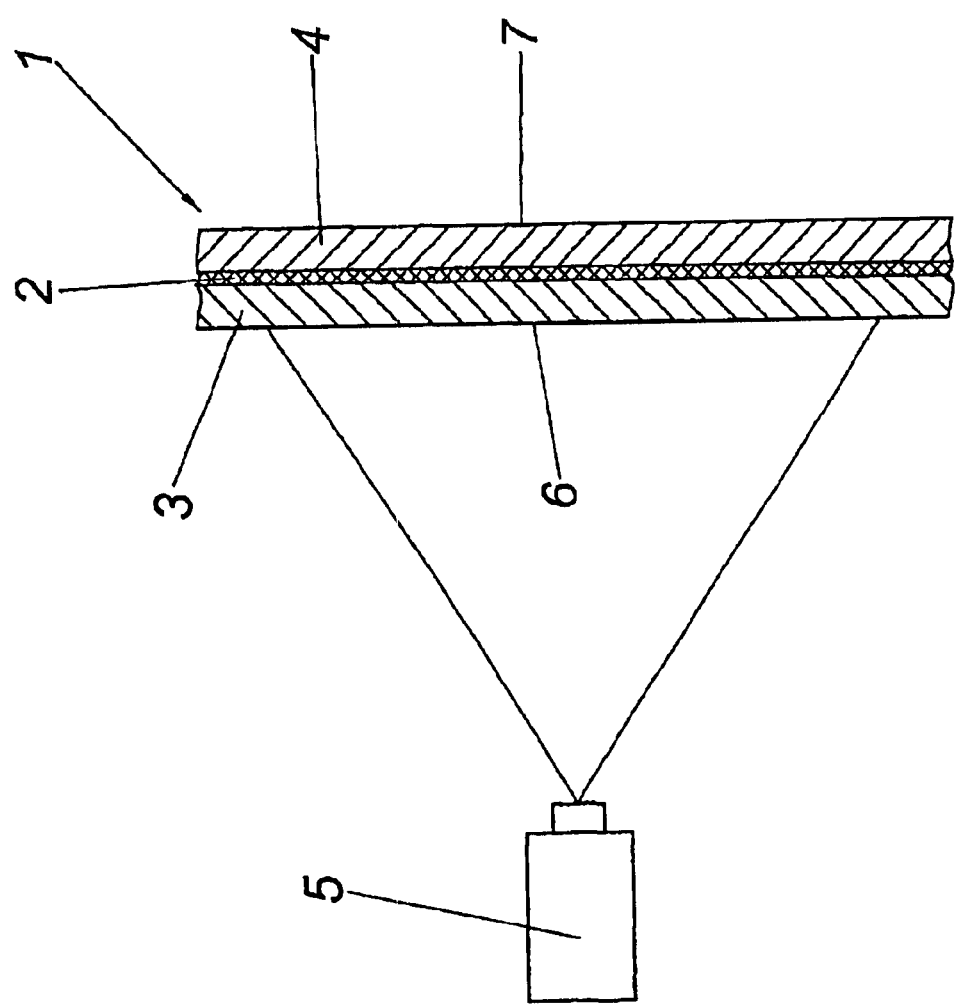

PROJECTOR SCREEN MADE FROM A COMPOSITE GLASS

TECHNICAL FIELD

The invention relates to a projection screen made of a laminated glass which has at least two glass plates bonded to each other by means of a layer of plastic.

PRIOR ART

Projection screens of this type, in particular rear projection screens, in the case of which optical signals is projected onto the side of the projection screen facing away from a viewer and on which images are depicted in such a way that the viewer can see them on the side of the projection screen facing him, are used mainly for presentations, for showing movie films, for television sets and the like. In this case, to present the image, for example, sheets provided with a multiplicity of lenses are arranged between glass plates (U.S. Pat. No. 4,219,253 A1). However, the projected image can in this case only be viewed from one side of the projection screen. It is also known to project images onto webs of thin translucent material or transparent paper. However, these projection screens cannot be readily used outdoors, since they have to be protected from the effects of weather and usually have an inadequate image reproducing capability.

SUMMARY OF THE INVENTION

The invention is therefore based on the object of providing a projection screen of the type described at the beginning which allows viewing of a projected image on the side of the projection screen facing away from the projector just as well as on the side facing the projector. Moreover, the projection screen according to the invention is to have only a low flicker effect and not have any light spots or places with excessive gloss and, while permitting low production costs, be able to withstand the greatest possible mechanical loads.

The invention achieves this object by the glass plate facing the projection preferably bearing on its outer side a translucent ceramic coating extending at least over the projection area and by the glass plate facing away from the projection preferably having a surface roughness preventing reflections.

The translucent ceramic coating has a transparent, pellucid appearance and is intended to prevent rays of light which are cast by a projector onto the projection screen from being reflected at this coating. Moreover, this coating has the effect of concentrating the projection rays transmitted through this layer onto the layer of plastic. The layer of plastic comprises, for example, a matt, white translucent sheet of plastic or layer of synthetic resin, on which the projected image is depicted. The matt white nature of this layer of plastic brings about a characteristic dispersion and partial reflection of the rays of light and consequently achieves best possible reproduction of the image. To prevent places with excessive and consequently disturbing gloss, the surface of the glass plate facing away from the projection is provided with a defined surface roughness.

It has proven to be particularly advantageous if the glass plate with the translucent ceramic coating consists of a glass that is low in iron oxide and the glass plate provided with the surface roughness consists of silicate glass. The glass that is low in iron oxide assists the filtering effect of the ceramic coating and the silicate glass ensures best possible reproduction of the image on the side facing away from the projection device. According to the invention, consequently at least two glass plates and a layer of plastic are combined with one another in such a way that they have the property of presenting impinging projection light on the projection screen. The special combination of the materials at the same time achieves the effect that the projected image can be viewed from both sides. Instead of the conventional glass plates, however, synthetic glass, in particular acrylic glass, can also be used. The projection screen according to the invention can be integrated particularly easily into the facade of a building, whereby effective advertising areas can be created for example.

To be able to produce the projection screen particularly easily and at low cost, the layer of plastic is a white, translucent sheet of polyvinyl butyral. This sheet of polyvinyl butyral simply has to be adhesively bonded with two glass plates in order to achieve the desired effect. In order to ensure the dispersion and partial reflection of the projected light on the sheet of polyvinyl butyral, the sheet of polyvinyl butyral contains matt, white chalk pigments.

A uniform, defined layer thickness of the ceramic coating is obtained if the translucent ceramic coating comprises a screen-printed layer. This allows the coating to be applied uniformly and quickly to a glass plate. The coating comprises, for example, a lacquer of glass powder with metal oxides which is fired at preferably 600 to 630° C., whereby the coating enters into a solid bond with the glass plate. With the aid of the screen-printed coating, it can be ensured that the translucent ceramic coating has a thickness of from 5 to 10 $\mu$m. If the layer were too thick, the projection rays would be attenuated too much when they are transmitted through this layer, and the image to be projected would consequently be presented with too little light intensity and, if the thickness of the ceramic coating is too small, a reflection of the projection rays cannot be avoided.

In order to avoid disturbing gloss on the glass plate facing away from the projection, the peak-to-valley height of the glass plate provided with the surface roughness lies in the range from 2 to 5 $\mu$m. This required peak-to-valley height is best obtained by etching the surface of the glass plate. This avoids disturbing light reflections on the outer surface. If the layer of plastic is made up of two sheets, that is a translucent sheet of polyvinyl butyral and a clear sheet of polyvinyl butyral, the optical properties of the ceramic coating and of the layer of plastic can be made to match one another well.

The combination of the two glass plates with the sheet of plastic lying in between has the effect of preventing a concentrated point of light on the glass surfaces from being produced during incident-light and transmitted-light projection, which prevents a clear projection image. The cone of light produced by every projector, which normally appears on the glass surface as a disturbing point of light, is dispersed by the ceramic coating in such a way that no disturbing concentrated point of light is produced and the projected image can consequently be clearly seen. Moreover, the projected image is not falsified in its color and is presented in a uniformly sharp and undistorted way. The special property of the projection area has the effect that the projected image can be viewed on the front side and on the rear side, whereby the projection screen according to the invention can be used equally well for presentations in lecture rooms as for advertising purposes on facades.

BRIEF DESCRIPTION OF THE DRAWING

In the drawing, the projection screen according to the invention is represented purely schematically in a partly sectioned front view.

WAY OF IMPLEMENTING THE INVENTION

A projection screen 1 comprises two glass plates 3, 4 bonded to each other by means of a layer of plastic 2. The glass plate 3 facing a projection device 5 bears on its outer side 6 a translucent ceramic coating extending at least over the projection area and the glass plate 4 facing away from the projection device 5 has on its surface 7 a surface roughness preventing reflections. The glass plate 3 consists of a glass that is low in iron oxide and the glass plate 4 consists of silicate glass. The layer of plastic 2 is a white, translucent sheet of polyvinyl butyral.

What is claimed is:

1. A projection screen comprising:
   a first glass plate having a first surface and a second surface;
   a second glass plate having a third surface and a fourth surface; and
   a layer of plastic;
   wherein the layer of plastic is dispersed between the first glass plate and the second glass plate and contacts the first surface of the first glass plate and the third surface of the second glass plate; the second surface of the first glass plate is coated with a translucent ceramic coating; and the fourth surface of the second glass plate is a rough surface.

2. The projection screen of claim 1, wherein the first glass plate has a low iron oxide content.

3. The projection screen of claim 1, wherein the second glass plate is silicate glass.

4. The projection screen of claim 1, wherein the sheet of plastic is a white, translucent sheet of polyvinyl butyral.

5. The projection screen of claim 4, wherein the sheet of polyvinyl butyral contains matt, white chalk pigments.

6. The projection screen of claim 1, wherein the translucent ceramic coating is a screen-printed layer.

7. The projection screen of claim 1, wherein the translucent ceramic coating has a thickness of between 5 and 10 $\mu$m.

8. The projection screen of claim 1, wherein the rough surface of the second glass plate has a roughness with a peak-to-valley height of between 2 and 5 $\mu$m.

9. The projection screen of claim 1, wherein the layer of plastic comprises a translucent sheet of polyvinyl butyral and a clear sheet of poly vinyl butyral.

* * * * *